May 6, 1930. H. M. SCHLEICHER 1,757,592
AUTOCLAVE AND METHOD OF OPERATING SAME
Filed Nov. 6, 1925
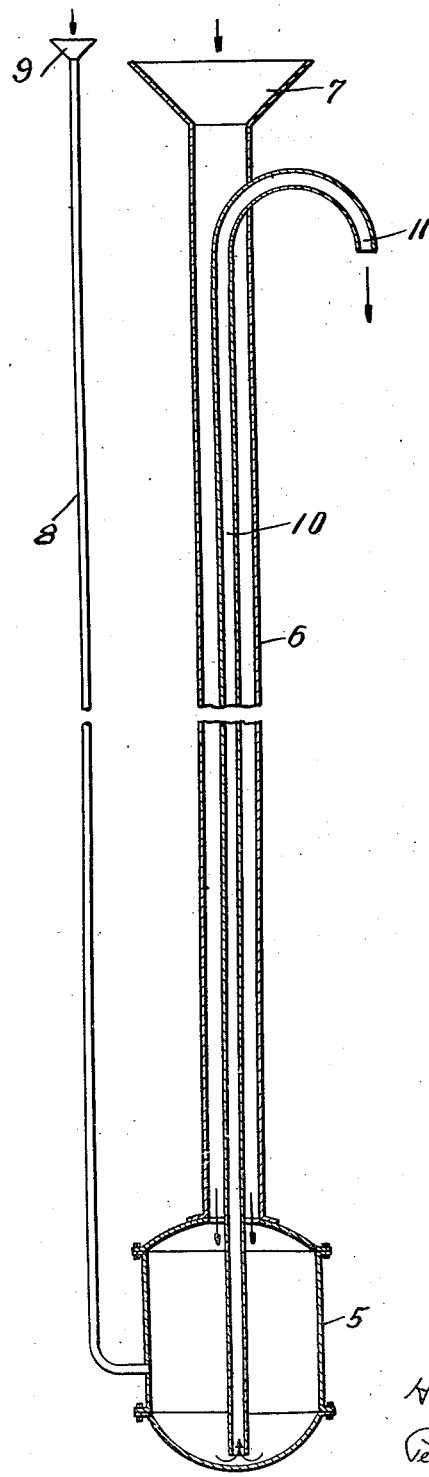
INVENTOR
Henry M. Schleicher
BY
his ATTORNEYS Patented May 6, 1930

1,757,592

UNITED STATES PATENT OFFICE

HENRY M. SCHLEICHER, OF MONTERREY, MEXICO

AUTOCLAVE AND METHOD OF OPERATING SAME

Application filed November 6, 1925. Serial No. 67,225.

This invention relates to a method of carrying out chemical reactions under pressure and to an apparatus in which such reactions can be conducted. The invention involves the maintenance of pressure in the reaction chamber by means of a hydrostatic head and the continuous operation of the reaction.

It is usual to conduct chemical reactions under pressure in an apparatus known as an autoclave in which the pressure is maintained usually by the application of heat. In such an apparatus the materials are introduced and the pressure is raised to the desired point and maintained there until the reaction is completed. It is necessary then to reduce the pressure before the autoclave can be opened or refilled at atmospheric pressure. The operation is therefore intermittent and considerable time is lost during the periods of discharging and refilling.

It is the object of the present invention to provide a method and apparatus whereby material used in the reaction can be introduced and the product can be withdrawn continuously while the required pressure is maintained at the point where the reaction occurs.

Other objects and advantages of the invention will be apparent as it is better understood by reference to the following specification and accompanying drawing which illustrates diagrammatically one form of apparatus which is suitable for the purpose.

The invention may be employed wherever one of the materials to be utilized is in liquid form so that a column thereof of a suitable height to ensure the maintenance of the desired pressure can be utilized. The column of liquid can be connected then to a reaction chamber in which the reaction is conducted.
Such a chamber may be of any suitable form and may be disposed in a furnace or heated otherwise if desired. A coil may thus be utilized as the reaction chamber or in place thereof a relatively thick-walled vessel of any form having the requisite strength to withstand the pressure may be utilized. In order that the product of the reaction may be withdrawn continuously a suitable outlet is connected to the reaction chamber and this may be conducted through the column through which the material is introduced, with the added advantage of heat interchange between the entering material and the product withdrawn. If heat interchange is not desirable the outlet can be separated from the column so that there is no transfer of heat between the entering material and the product. In either case the outlet is arranged with respect to the column through which the material enters so that the hydrostatic head which provides the pressure within the reaction chamber is maintained constantly. The outlet should be sufficiently lower than the inlet to the column so that the difference in pressure will ensure the movement of the material continuously through the reaction chamber. The latter should be of sufficient size to ensure retention of the material therein for a period long enough to permit the completion of the reaction. If the product includes solid material suspended in a liquid, the outlet should be of such dimensions as to ensure enough velocity to prevent settling of the solids therein.

The method and apparatus can be utilized for various purposes as, for example, the leaching of ores under pressure. In employing the invention for this purpose the ore, after grinding and such other preliminary treatment as is usual in view of the nature of the material, can be mixed with the leach liquor and delivered continuously to the column. If the apparatus is properly designed the mixture of liquid and solids will descend under the action of gravity into the reaction chamber and the pressure maintained therein will be equal to the hydrostatic head due to the height of the discharge column. The reaction chamber can be heated in any suitable manner so that the leaching will be conducted most efficiently. As fresh material enters the column a portion of the liquor with the ore suspended therein will be forced upwardly through the outlet and discharged at substantially atmospheric pressure. By placing the outlet within the column the heat carried in the material passing through the outlet will be transferred to the fresh material entering through the column and the heat will be conserved consequently. By operating in this manner the leaching of ores and similar materials under pressure can be conducted most efficiently and with the minimum application of power to maintain the pressure and to ensure the movement of the material. Furthermore, the operation can be conducted continuously and losses heretofore experienced in attempting to carry out leaching operations under pressure will be avoided. An added advantage is the elimination of the possibility of dangerous explosions. Should the reaction chamber collapse because of any defect therein, the relatively small amount of liquor which is highly heated will avoid the production of a large amount of vapor. Moreover, it is a relatively simple matter to so protect the reaction chamber which is relatively small that the bursting thereof cannot injure anything in the vicinity. The apparatus may be applied, for example, in a mine shaft so that the required hydrostatic head is obtained very simply by placing the reaction chamber at a suitable level in the shaft. The column and outlet pipe can then be fastened to the wall of the shaft so that the system may be supported without employing an expensive structure.

The invention can be utilized likewise in reactions involving the introduction of a gaseous reagent. In such a case the hydrostatic pressure is maintained by the column of liquid and the gas is introduced through a separate pipe to the reaction chamber under pressure maintained by the use of a suitable pump. An instance of such an application of the invention is in the treatment of copper sulphate solution with sulphur dioxide to precipitate metallic copper. The copper sulphate solution will be introduced to the column and will rise in the discharge pipe, for the purpose of maintaining the hydrostatic head and the sulphur dioxide will be carried to the reaction chamber through a separate pipe under the pressure necessary to overcome the hydrostatic head in the reaction chamber. The precipitated copper will be carried upwardly through the discharge pipe with the solution which overflows therefrom. The excess of gas can be trapped readily at the outlet in any well known manner and recovered for further use.

In the event that two liquid reagents are to be combined, but only under the pressure maintained within the reaction chamber, one may be introduced through the column and another through a separate pipe of a suitable length to provide for equalization of the pressure at the reaction chamber. The two reagents in that case will mix in the reaction chamber and the product of the reaction will escape through the outlet pipe. The introduction of the reagents in this manner ensures the proper combination thereof under the requisite pressure conditions to provide maximum efficiency of the reaction.

If the reaction is exothermic it may be desirable to cool the reaction chamber, and this can be accomplished by the provision of coils or other cooling means in association therewith. The cooling can be applied also to the column, the outlet pipe being in this case separated preferably from the column so that there will be no heat transfer between the outgoing product and the material entering through the column.

Referring to the drawing, the apparatus may, for example, comprise a chamber 5 constructed of steel or other suitable metal, the walls being of sufficient thickness to withstand the pressure maintained therein. A column 6 extends upwardly from the reaction chamber and the material to be treated can be introduced through an inlet 7 at the top thereof. A second pipe 8 is connected to the reaction chamber 5 and is provided with an inlet 9. This permits the introduction of reagents separately if this is desirable. If a gaseous reagent is introduced through the pipe 8 the latter is connected to a suitable pump (not shown) which maintains the gas under the necessary pressure. An outlet pipe 10 extends into the reaction chamber to a point near the bottom thereof and passes upwardly in this case through the column 6. The upper end of the pipe 10 is carried through the wall of the column 6 and is provided with a discharge outlet 11 somewhat below the level of the upper end of the column. The difference in level between the inlet to the column and the outlet from the discharge pipe should be such as to permit the discharge of the liquid at substantially atmospheric pressure. The liquid in the reaction chamber will then be constantly under a pressure which is equal to the hydrostatic head maintained by the column of liquid between the levels of the discharge outlet and the reaction chamber. This hydrostatic head is constant regardless of the rate of flow of the liquid through the reaction chamber to the outlet and the reaction may be carried out continuously, therefore, at the desired pressure, it being necessary merely to regulate the rate of flow so that sufficient time is permitted for the completion of the reaction in the chamber.

Various changes may be made in the details of operation of the method and in the apparatus employed therefor without departing from the invention or sacrificing any of the advantages thereof.

I claim:

1. The method of conducting chemical reactions under pressure, which comprises continuously supplying a liquid to the reaction chamber, continuously withdrawing the product of the reaction in conductive heat-exchange relation with the entering liquid and maintaining the pressure in the chamber by a hydrostatic head of the liquid.

2. The method of conducting chemical reactions under pressure, which comprises introducing a liquid to a reaction chamber under a sufficient hydrostatic head to maintain the pressure and continuously withdrawing the reaction product in conductive heat-exchange relation with the entering liquid.

3. An apparatus for conducting chemical reactions under pressure, which comprises a reaction chamber, a column connected thereto of sufficient length to maintain the pressure desired by a hydrostatic head, a conduit for withdrawing the product of reaction, said conduit being in conductive contact with the liquid in the column whereby heat-exchange may take place between the liquid in the column and the product of the reaction.

4. An apparatus for conducting chemical reactions under pressure, which comprises a reaction chamber, a column connected thereto of sufficient length to obtain the pressure desired by a hydrostatic head of a constituent of the reaction and an outlet pipe extending within the column to a point somewhat lower than the top thereof.

5. An apparatus for conducting chemical reactions under pressure, which comprises a reaction chamber, a column connected to the top of the chamber of sufficient length to obtain the desired pressure in the chamber by means of the head of a liquid constituent of the reaction, a discharge tube for the products of the reaction having an inlet adjacent the bottom of the chamber and operable by the pressure of the liquid, and a third tube communicating with the chamber for the introduction of a reagent thereto.

In testimony whereof I affix my signature.

HENRY M. SCHLEICHER.